United States Patent [19]
Korb

[11] Patent Number: 5,942,558
[45] Date of Patent: Aug. 24, 1999

[54] HYDROGEL LENS PRE-COATED WITH LIPID LAYER

[75] Inventor: Donald R. Korb, Boston, Mass.

[73] Assignee: Ocular Research of Boston, Inc., Boston, Mass.

[21] Appl. No.: 08/942,244

[22] Filed: Oct. 1, 1997

Related U.S. Application Data

[63] Continuation of application No. 08/721,892, Sep. 27, 1996, abandoned, which is a continuation of application No. 08/410,355, Mar. 24, 1995, abandoned.

[51] Int. Cl.⁶ .............................. G02B 01/04; C08J 07/04
[52] U.S. Cl. .................... 523/106; 524/140; 524/916; 514/75; 514/558; 264/1.7; 351/160 H; 427/2.24; 424/429; 526/277
[58] Field of Search .................. 523/106; 524/140, 524/916; 526/277; 351/160 H; 427/2.24; 424/429; 514/75, 558; 264/1.7

[56] References Cited

U.S. PATENT DOCUMENTS

| | | | |
|---|---|---|---|
| 4,056,496 | 11/1977 | Mancini et al. | 524/916 |
| 4,128,318 | 12/1978 | Sieglaff et al. | 523/106 |
| 4,410,442 | 10/1983 | Lucas et al. | 514/558 |
| 4,914,088 | 4/1990 | Glonek et al. | 514/76 |
| 5,294,607 | 3/1994 | Glonek et al. | 514/912 |
| 5,331,059 | 7/1994 | Engelhardt et al. | 524/916 |
| 5,461,433 | 10/1995 | Nakabayashi et al. | 523/106 |
| 5,472,703 | 12/1995 | Vanderlaan et al. | 424/429 |

FOREIGN PATENT DOCUMENTS

| | | |
|---|---|---|
| 0 256 344 A2 | 2/1988 | European Pat. Off. . |
| 0 312 814 A1 | 4/1989 | European Pat. Off. . |
| 0 459 148 A2 | 12/1991 | European Pat. Off. . |
| 0 535 545 A1 | 4/1993 | European Pat. Off. . |
| 9106020 | 5/1991 | WIPO ................ 523/106 |

OTHER PUBLICATIONS

Guillon, et al., "Corneal desiccation staining with hydrogel lenses: Tear Film and contact lens factors", *Ophthalmic Physiol. Opt.*, Oct. 11, 1990, vol. 10(4), pp. 343–350.

Donald R. Korb, "Tear FIlm—Contact Lens Interactions", Lacrimal Gland, Tear Film, and Dry Eye Syndromes, Edited by D.A. Sullivan, Plenum Press, New York, 1994, pp. 403–410.

*Primary Examiner*—Andrew E. C. Merriam
*Attorney, Agent, or Firm*—Robert L. Goldberg

[57] ABSTRACT

A storage solution for a hydrogel contact lens comprising a material having polar groups at one end and non-polar groups at the other end. The storage solution desirably further contains an oil. The material comprising polar and non-polar groups modifies the surface properties of the lens and facilitating the formation of a lipid layer over the lens.

27 Claims, No Drawings

HYDROGEL LENS PRE-COATED WITH LIPID LAYER

This application is a continuation of application Ser. No. 08/721,892 filed on Sep. 27, 1996, now abandoned, which is a continuation of application Ser. No. 08/410,355 filed on Mar. 24, 1995 now abandoned.

BACKGROUND OF THE INVENTION

1. Introduction

This invention relates to a contact lens having its anterior surface coated with an evaporation barrier layer prior to or following insertion of the same into the eye. The invention also includes a solution that enables formation of the evaporation barrier layer and storage of the lens. More particularly, this invention relates to a means for preventing ocular desiccation during use of contact lenses.

2. Description of the Prior Art

It is known that insertion of a contact lens onto the eye and prolonged wearing of the lens can cause discomfort. There are many known reasons to explain the cause of the discomfort including lens fitting characteristics, lens edge design, lens movement, oxygen deprivation, ocular sensitivities, immune reaction, lid positioning, etc. However, one of the most, if not the most significant cause of discomfort, is the disruption of the protective lipid layer of the tear film over the ocular service resulting in subsequent desiccation of the ocular surface. Excessive evaporation also occurs from the front (anterior) surface of the contact lens. Ocular desiccation as a consequence of hydrogel contact lens wear was observed by Guillon et al., Ocular Desiccation Staining With Hydrogel Lenses: Tear Film and Contact Lens Factors, Ophthalmic Physiol Opt, October, 1990, 10 (4) pp. 343–350. The authors report their observation that during monitoring the response of established contact lens wearers, "ocular desiccation staining was present and associated with a rapidly destabilizing pre-lens tear film (PLTF) and a thinning lipid layer". "The initial breakup or disruption of the PLTF and corneal staining were recorded with a higher incidence in the vertical quadrants than in the horizontal quadrants. The PLTF is thinnest and most unstable at the tear-prism margin border, hence least efficacious at preventing evaporation". It was further observed by the authors that: "ocular desiccation staining may be due, at least partly, to excessive evaporation at the contact lens front surface."

An explanation similar to Guillon's was offered by Korb, Lacrimal Gland Tear Film, and Dry Eye Syndromes, edited by D. A. Sullivan, Plenum Press, New York, 1994, pp. 403–410. Korb, citing A. Tomlinson and T. H. Cedarstaff, Tear Evaporation from the Human Eye: The Effects of Contact Lens Wear, *J. Br. C.L. Assoc.* 5:141–150 (1982) and Guillon in Tear Film Photography and Contact Lens Wear, *J. Brit. C. L. Assoc.* 5:84–87 (1982), states that the lipid layer is compromised by the presence of a contact lens which leads to increased evaporation. Korb observed from his investigations that a normal lipid layer is not present with rigid lenses and that lipid layers on hydrogel lenses are variable and rarely similar to the lipid layers observed on eyes without lenses. Korb, in quoting M. J. Refojo, The tear film and contact lenses: the effect of water evaporation from the ocular surface, *Simposio del Societa Optolmolgia Italiana*, Rome (1984), stated that "'when a contact lens is placed in the eye, the lens alters the normal structure of the tear film and affects its rate of evaporation. These changes affect the ocular surface as well as the contact lens itself'". Korb, in summary stated that: "Both blinking and evaporation are recognized as critical factors in contact lens wear. Thus, future goals should be to increase the pre-corneal tear film thickness, and particularly to increase lipid layer thickness and quality, in order to minimize evaporation and maintain ocular surface integrity. New contact lens materials are required which would mimic the ocular surface so as to allow a pre-lens tear film which more nearly replicates the remarkably efficacious pre-ocular tear film, complete with lipid layer. This would decrease the evaporation rate and thus improve contact lens tolerance".

In a subsequent publication by Korb, entitled "The Effect of Periocular Humidity on the Tear Film Lipid Layer, *Investigative Ophthalmology and Visual Science*, Vol. 1995, Vol. 36, it was reported that: "Increased periocular humidity results in an increase in tear film lipid layer thickness, possibly by providing an environment that is more conducive to the spreading of meibomian lipid and its incorporation into the tear film." This conclusion was reached by placing modified swim goggles over the eyes of patients for 60 minutes and monitoring the tear film. The goggles functioned as an evaporation barrier over the eye creating a condition of high humidity in the enclosed space between the goggles and the eye. It was observed that the lipid layer increased significantly in thickness within 5 minutes of exposure to conditions of high humidity reaching a maximum increase after 15 minutes of goggle wear. This increase to a maximum lipid layer thickness was maintained at the 30 and 60 minute goggle time points. Following the goggle removal, the values declined but remained significantly elevated over the lipid layer thickness of the control contralateral eye throughout the 60 minute post-goggle period. Moderate to total relief of dry eye symptoms was reported during goggle wear and generally persisted at a reduced level for 1–3 hours following goggle removal. Thus, the high humidity contributed to the formation of an improved lipid layer over the surface of the eye, and also contributed to the decrease in comfort caused by the conditions known as dry eye. Also, in the above cited Korb publication, it was reported that goggles creating a 100% humidity environment for 30 minutes would improve the prelens lipid layer thickness in all instances.

Conclusions that can be reached from the above publications are that the lipid layer over the eye preserves the aqueous tear film. An evaporation barrier over the eye leading to an environment of increased humidity appears to enhance the tear film. Placement of the lens on an eye disrupts the lipid layer and thus leads to ocular desiccation, a decrease in the aqueous layer and discomfort associated with the wearing of a lens.

SUMMARY OF THE INVENTION

The subject invention is based upon the following premises: (1) an evaporation barrier promotes formation of a thicker lipid layer over the eye; (2) placement of any contact lens, for example, a hydrated hydrogel lens, over the eye disrupts the tear film leading to desiccation of the aqueous component of the tear film; and (3) a lipid layer is not readily formed over either the front (anterior) surface of a contemporary hydrogel (hydrophilic) lens or rigid gas permeable lens when the lens is worn on the eye. Recognizing the foregoing, the present invention provides a hydrogel or rigid gas permeable contact lens having at least its anterior surface coated with an evaporation barrier to promote lipid layer formation and prevent desiccation of the corneal surface during its use. The invention also provides compositions suitable for storage of such contact lenses which solutions promote the formation of an evaporation barrier layer over all surfaces of the lens inclusive of the anterior surface. In one embodiment of the invention, the storage solution surface modifies the surfaces of a lens to promote rapid lipid layer formation over the lens surfaces prior to or during its use.

The invention is in part based upon the recognition that a fully hydrated hydrogel contact lens typically contains from 35 to 60% water and may contain as much as 80% water. Therefore, the fully hydrated lens is essentially a hydrophilic aqueous layer. In contrast, a lipid layer comprising the tear film over the surface of the eye is an oleophilic, hydrophobic material on its outer surface and is bonded to an underlying aqueous phase by an interstitial polar layer. Therefore, as should be expected, the hydrophilic surface of a hydrated contact lens will repel the hydrophobic lipid layer thus preventing formation of a lipid layer over the surface of the hydrated hydrogel lens because the hydrated hydrogel lens does not have an interstitial bonding layer capable of bonding the lipid layer to the hydrated surface of the lens.

In accordance with the invention described herein, the surface of a hydrogel contact lens is modified to impart hydrophobic surface properties to the lens. The hydrophobic surface of the so modified lens is then readily coated with a hydrophobic lipid layer, either artificially, or with the naturally occurring tear film upon insertion into the eye. The lipid layer over the entire surface of the lens functions as an evaporation barrier which reduces ocular desiccation during use of the lens while promoting thickening of the lipid layer. The method used to prevent ocular desiccation by providing a lipid layer over the surface of a lens is analogous to the manner in which the normal tear film over the eye prevents ocular desiccation.

In accordance with one embodiment of the invention, the surface of a hydrated hydrogel lens is rendered hydrophobic by formation of an interstitial layer over the surface of the lens of molecules having a polar end, a non-polar end and desirably an interconnecting group between the polar and non-polar ends, hereafter the "interstitial film former". The polar end of the interstitial film former is capable of bonding with the hydrophilic residues of the lens material and with the organized water layer on the surface of the hydrogel lens, typically by hydrogen bonding. The non-polar ends of the interstitial film former will bond with the lipid layer thus promoting formation of a lipid layer over the lens.

One method for formation of the interstitial layer over the lens is to provide a lens storage solution containing the interstitial film former as an additive. Prolonged contact of a stored lens with the storage material containing the interstitial film former will result in formation of the interstitial film over the lens.

DESCRIPTION OF THE PREFERRED EMBODIMENTS

The invention described herein involves the use of an evaporation barrier layer over the anterior surface of a contact lens. The term "evaporation barrier" as used herein refers to a thin film such as a lipid film over the anterior surface of a lens which retards evaporation of water from the surface of the eye but does not substantially inhibit the transport of oxygen through the lens. It is believed that an effective evaporation barrier layer in accordance with the invention should have a thickness ranging between 60 and 180 nanometers, and more preferably, between 90 and 150 nanometers, in order to mimic the preferred analogous lipid film over the ocular surfaces of the eye.

The invention herein also involves the use of certain lens storage solutions. It is known in the art that hydrogel contact lenses are conventionally packaged in saline solution prior to sale to maintain the hydrated state of the lens. Conventional hydrogel contact lenses, during periods of non-use, are stored in saline solutions for dual purposes of maintaining the lens hydrated and for disinfection. These prior art storage solutions do not contain additives that would result in formation of an evaporation barrier layer over the surface of a lens.

The compositions and process of the invention for formation of an evaporation barrier layer are suitable for use with essentially any contact lens and is especially suitable for use with the hydrogel contact lenses. For example, the invention is useful with disposable daily wear lenses which are stored in a storage solution for a prolonged time prior to use, worn for a day and then thrown away. The invention is also useful with all contact lenses, either daily or extended wear lenses, when they are removed at night, stored in a storage solution overnight and reinserted into the eye in the morning.

The storage solution of the invention comprises an interstitial film former and desirably, a lipid capable of forming an evaporation barrier over a film formed from the interstitial film former. The material suitable for formation of the interstitial film over the lens is a material having polar groups at one end of its molecule, non-polar groups at the other end of its molecule and desirably an interconnecting segment between the two groups. The material should be physiologically acceptable to the eye. Preferably, the material is capable of forming a self-assembled and aligned monomolecular film whereby the non-polar groups of the molecule will be aligned away from the polar groups.

A particularly useful class of interstitial film forming material for purposes of this invention are phospholipids carrying a net charge under conditions of use. It is known that complex phospholipids contain a polar group at one end of their molecular structure and a non-polar group at the opposite end of their molecular structure. A discussion of phospholipids can be found in Lehninger, *Biochemistry*, 2 ed., Worth Publishers, New York, pp. 279–306, incorporated herein by reference.

Many complex phospholipids are known to the art. They differ in size, shape and the electric charge of their polar head groups. Phosphoglycerides are compounds where one primary hydroxyl group of glycerol is esterified to phosphoric acid, and the other two hydroxyl groups are esterified with fatty acids. The parent compound of the series is, therefore, the phosphoric acid ester of glycerol. This compound has an asymmetric carbon atom and, therefore, the term phosphoglycerides includes stereoisomers.

All phosphoglycerides have a negative charge at the phosphate group at pH7, and the $pK_a$ of this group is in the range of 1 to 2. The head groups of phosphatidylinositol, phosphatidylglycerol including diphosphatidylglycerols (having the common name cardiolipins) and the phosphatidylsugars have no electric charge, and all are polar because of their high hydroxyl group content. Because of the negative charge of the phosphate group and the absence of a charge in the head group, the net charge of each of these materials is negative, and these materials are within the scope of the invention. Likewise, the head group of phosphatidylserine contains an alpha-amino group ($pK_a$=10) and, a carboxyl group ($pK_a$=3) and therefore, the molecule contains two negative charges and one positive charge at pH 7.0, giving it a net negative charge whereby this compound is also within the scope of the invention.

Complex phospholipids having a net positive charge are also within the scope of this invention but are lesser preferred because of the price and scarcity of these compounds. Examples of positively charged complex phospholipids within the scope of the invention are those containing the basic acyl amino acid groups. Such compounds are a subgroup within the family of the O-aminoacylphosphatidylglycerols.

In contrast to the charged phospholipids, the head groups of phosphatidylethanolamine and phosphatidylcholine (lecithin) have a positive charge at pH 7, and, thus, at this pH, these two phosphoglycerides are dipolar zwitterions with no net electric charge.

Of the phospholipids discussed above, the net-charged phosphoglycerides are preferred for purposes of the invention. A more preferred class of phosphoglycerides are represented by the following generic formula:

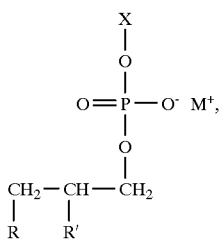

where R and R' are each fatty acid residues preferably having from 8 to 24 carbon atoms; X is hydrogen, a polyol or a 3'-O-aminoacylphosphatidylglycerol; and M is one equivalent of a countercation. R and R' are typically common natural fatty acids having an even or odd number of carbon atoms; they may be the same or may differ from each other; and they may be saturated, monounsaturated or polyunsaturated. Examples of fatty acid residues include palmitate, stearate, oleaste, linoleate, octanoate, dodecate, lignocerate, etc.

The most preferred composition for formation of the interstitial layer will be a mixture of complex phospholipids where each phospholipid component has a net negative charge. The most preferred phospholipids are the phosphatidylglycerols, including cardiolipins, and phosphatidylinositols.

In addition to the phospholipids, there are numerous classes of substances whose molecules, under appropriate conditions, self-assemble to form thin films having polar end groups and non-polar end groups opposite from each other. One such class of material are the silanes having polar end groups such as carboxylic acids, acid chlorides, anhydrides, sulfonyl groups, phosphoryl groups, hydroxyl groups and amino acid groups and non-polar end groups including olefins, acetylenes, diacetylenes, acrylates, methacrylates and esters. Examples of such materials include 7-octenyl dimethylchlorosilane and 5-hexenyldimethylchlorosilane.

The interstitial film is formed over a lens such as by chemisorption when the lens is immersed in a solution that contains the film forming material as an additive in minor concentration, preferably for an extended period of time such as during storage of the lens in the solution. An aqueous based solution or dispersion is preferred. Many interstitial film formers are insoluble in aqueous solution though a few are soluble. For those materials having a solubility within a useful concentration range, a simple aqueous solution of the film forming material and the aqueous solution is satisfactory. For those film forming materials that are essentially water insoluble, an aqueous composition in the form of an emulsion may be used. An emulsion provides a storage composition where the phase containing the film forming component is homogeneously distributed throughout an aqueous vehicle. An emulsion is readily formed by agitating one or more film forming materials and physiologic saline. Agitation is continued until a homogeneous dispersion is obtained. Emulsification may be by sonnification or may be assisted by use of an emulsifying agent which may be added to the formulation to stabilize the emulsion for long storage, extended shelf life and thermal stability. Both stable emulsions and meta-stable emulsions are contemplated by the invention.

The concentration of the interstitial film former in the storage composition may vary within wide limits. A treatment composition containing the film former in an amount as low as 0.01% provides benefits. When the storage composition is in the form of an emulsion, compositions containing the film former in elevated concentrations approaching collapse of the emulsion into separate phases is possible though undesired. A clinically practical concentration range for the film forming component in its aqueous vehicle varies from about 0.05 to 5.0% by weight and more preferably, from about 0.1 and 3.0% by weight.

As stated above, the formation of the interstitial film former over the lens surface enables formation or maintenance of an evaporation barrier over the anterior surface of the lens. When the lens coated with the interstitial film is inserted into the eye, it is believed that the evaporation barrier is formed over the lens during blinking when the lipid is spread over the surfaces of the lens and ocular tissue. The lipid is derived from the meibomian glands and it is known that a complete blink increases lipid layer thickness in the eye by expressing the meibomian glands as explained by Korb et al., Tear film lipid layer thickness as a function of blinking, Cornea, 13(4):354–359, 1994. The inferior meniscus at the lower lid also acts as a reservoir for lipid expressed from the meibomian glands and with blinking actions, when the upper lid contacts this reservoir, the lipid is spread upward. If the quantity and quality characteristics of the lipids are adequate, a lipid layer will form on the ocular surface and the anterior lens surface.

In accordance with one embodiment of the invention, the lipid for formation of the evaporation barrier may be one component of the storage solution. In this embodiment of the invention, the interstitial film is formed over the lens during storage and this enables the lipid to adhere to the lens while the lens is removed from the storage solution and inserted into the eye. The evaporation barrier may form in whole or in part over the interstitial film during storage, dependent upon the material of the interstitial film, and is fully formed during blinking when the lens is inserted onto the eye.

A preferred lipid for formation of the evaporation barrier over a lens surface is a saturated, relatively low viscosity oil, such as those oils derived from petroleum. Especially preferred are aliphatic oils having minimum or no polar substitution and having from 10 to 50 carbon atoms in their chain. Most preferred is mineral oil. If the oil is to be contained in the treatment solution, it is preferably present in an amount of at least 0.5 percent by weight of the treatment composition. Preferably, the oil content of the solution varies between about 1.0 and 12.5 percent by weight of the storage solution.

In accordance with an alternative embodiment of the invention, the evaporation barrier may be applied to the lens prior to storage in a storage solution. For example, following formation of the lens and prior to its hydration, the evaporation barrier may be applied to the lens by any of several methods. One such method comprises immersion of the lens coated with the interstitial film into a solution of the evaporation barrier material and rubbing as necessary to spread the oil. Alternatively, an aerosol of the evaporation barrier material may be prepared and the aerosol may be sprayed onto the surface of the lens prior to its hydration. In this embodiment of the invention, the evaporation barrier need not be liquid at room temperature but preferably should have a melting point at or below body temperature. A particularly desirable evaporation barrier material for application in the form of an aerosol is wax which would melt at body temperature when the lens having the wax coating is inserted into the eye. In this embodiment of the invention, the wax would be sprayed onto the lens surface, the lens immersed into a storage solution for storage and hydration and then inserted into the eye when ready for use.

The evaporation barrier may also be formed over the lens subsequent to its insertion into the eye. In this embodiment, the interstitial layer is formed over the lens prior to insertion into the eye. Thereafter, when the lens is inserted into the eye, the naturally occurring lipid layer in the eye will enable formation of the evaporation barrier. Blinking facilitates the formation of the evaporation barrier as the eyelid serves to spread the lipid layer over the lens surface having the interstitial layer with the hydrophobic surface.

The invention will be better understood by reference to the following examples.

EXAMPLE 1

Materials and Methods

A formulation was prepared having the following components and identified as PG.-101:

| Component | Weight Percent |
|---|---|
| Mineral oil | 10.00 |
| Phosphatidylglycerol | 0.05 |
| Surfactant | 0.15 |
| Ethylene diamine tetraacetic acid | 0.10 |
| Sodium chloride | 0.60 |
| Purified water | balance |

In the above formulation, the mineral oil used was Drakeol 35, a 35 weight oil manufactured by Penreco, a division of Pennzoil and the surfactant was Myrj 52, a polyethoxyethylene stearate available from ICI Chemicals of Wilmington, Del.

A contralateral eye study design was utilized where one eye would wear a lens prepared by immersion in the PG-101 formulation, while the second eye would wear a lens removed directly from the conventional packaging solution provided by the manufacturer. The disposable lens brand chosen was Acuvue (manufactured by Vistakon Division of Johnson & Johnson and comprising a hydroxy methyl methacrylate polymer containing 58% water when hydrated), which is packaged in a buffered saline solution provided in a single use plastic package. Thus, both eyes wore identical Acuvue lenses, but one lens was first removed from the original package and immersed in 5 cc of the PG-101 formulation for a minimum of two hours at normal room temperature. After this treatment, the lens was inserted directly onto the eye. The contralateral eye wore a lens inserted immediately upon removal from the conventional package and was not altered in any way.

A tear film apparatus as described in U.S. Pat. No. 5,294,607, incorporated herein by reference, was utilized to evaluate the characteristics of the lipid layer on the anterior surface of the lenses after their insertion into the eye.

In addition to the evaluation of the tear film, each subject was asked to report their subjective sensation at the following intervals: initially after one or two minutes, fifteen minutes, thirty minutes, one hour, two hours and three hours. Prior to insertion in the eye, each lens had previously been fitted in the best possible manner allowed by the choice of lens parameters for the Acuvue disposable lens series.

Results

Following insertion of an untreated lens into the eye, a normal lipid layer was not present on the anterior surface of any contact lens under standard conditions. However, when observing the interference pattern phenomena on the anterior surface of a contact lens with the tear film apparatus, an unusual phenomenon was noted and termed "the rapid evaporation phenomenon". This phenomenon is one where the lipid and aqueous thickness changes resulting from evaporation from the front surface of the lens is detected by color changes. These color changes occur in the inter-blink period. Thus, following a blink, colors are visible on the illuminated areas of the anterior surface of the contact lens. However, within one to three seconds the colors rapidly change and literally disappear leaving an illuminated surface devoid of color. This surface, after passing through color changes and becoming devoid of color, signifies an essential absence of all liquid vehicle. Prior to the disappearance of the colors, a number of changes in their appearance occurs, perhaps almost resembling a rapid kaleidoscopic movement of intense blues, reds, aquas, greens and yellows. The kaleidoscopic effect precedes the actual disappearance of the colors, at which time a colorless surface remains. The latter phenomena are in direct contrast to the appearance of the lipid layer on a normal eye, where the colors are less vivid and remain throughout the entire inter-blink period. The usual colors observed on the ocular surfaces (without a contact lens) are yellows, brown-reds, and blues. The colors observed on the surface of the contact lens appear artificial, and are intensified blues, reds, aquas, greens, and less frequently, yellows. Other differences are also noted, whereas on the ocular surfaces without a contact lens the movement of the lipid layer is slow, horizontal wave formations are present, and the colors gradually mellow indicating a thinner lipid layer with time, but do not disappear. In contrast, the habitual tear layer on the anterior surface of the hydrogel lens demonstrates the "rapid evaporation phenomenon", leaving a surface devoid of color indicating an essentially dry surface. The pattern of change of the colors on the lens surface indicates that there are many areas of desiccation on the lens surface which are occurring essentially simultaneously.

The eye wearing the lens immersed in the PG-101 water and oil formulation demonstrated a lipid layer with characteristics significantly more like that demonstrated by an eye without a contact lens, a more normal type of lipid layer. With those lenses immersed in the PG-101 storage solution, there was a minimal occurrence of the rapid evaporation phenomenon, relative to both the frequency and occurrence of the rapid evaporation phenomenon between blinks and the speed of change in the colors. The residence time of the desired colors on the surface of the lens prepared with the PG-101 formulation was at least double that the residence time of the colors on the conventionally prepared lens. In addition, wave patterns are also a distinguishing characteristic of normal lipid layers on normal eyes without contact lenses, and thus these horizontal wave formations are considered to be normal and desirable. The wave patterns with the conventionally prepared lens were highly altered, the wave patterns found with the eye wearing the lens immersed in the PG-101 formulation bore similar characteristics to that demonstrated by the lipid layer of a normal eye without a contact lens. Thus, the lens prepared by immersion in the PG-101 formulation presented significantly less alterations in lipid layer and tear film characteristics than did the lens prepared in the conventional manner.

A typical profile of the lipid layer characteristics as demonstrated by three subjects as follows:

TABLE 1

| Time | OD Acuvue Lens with Conventional Liquid Packaging Vehicle | OS Acuvue Lens Removed from Conventional Vehicle and Immersed for 2 Hours in PG-101 Water and Oil Emulsion |
|---|---|---|
| 1–2 minutes | REP (Rapid Evaporation Phenomenon) with intense abnormal colors. Indicates no significant lipid layer present, rapid evaporation of aqueous portion of tear film spresd over anterior surface of contact lens following blink. | Lipid layer characteristics were noted, including normal colors, particularly yellow, slow movement of the film, horizontal waves, and the colors remained on the tear film for extended periods of time. Only minimal REP was present over localized areas. |
| 15 minutes | REP with intense abnormal colors but some fading of colors and interval for disappearance of colors less than after 1–2 minutes, signifying surface of lens becoming dry. | No change from above. |
| 30 minutes | REP more severe. Definite decrease in intensity of colors. Colors disappeared more rapidly than at 1–2 minutes, frequently within 1–2 seconds. | Similar to initial findings but a slight decrease in the normal lipid layer features and appearance and a slight increase in REP. |
| 1 hour | Similar to results at 30 minutes, but REP even more rapid, colors no longer intense but dull. These findings indicate an absence of fluid on the anterior surface of the lens, due to rapid evaporation. | Even after 1, 2 and 3 hours, there was a distinct difference in the characteristics between the left and right eyes. The lens treated with the PG-101 formulation still presented features indicative of the presence of a lipid layer. In contrast, the untreated lens did not show any of these characteristics. Thus, the lens treated with PG-101 presented dramatically improved lipid layer and tear film characteristics to that found with the conventionally prepared lens surface. In fact, these desirable characteristics of the lipid layer were present after 3 hours, while they were never present with the conventionally packaged lens. |
| 2 hours | Similar to results at 30 minutes, but REP even more rapid, colors no longer intense but dull. These findings indicate an absence of fluid on the anterior surface of the lens, due to rapid evaporation. | Same as above. |
| 3 hours | Same as above. | Same as above. |

The comfort level of each of three subjects wearing the lens was also determined and rated in four categories with Category A signifying that the lens' physical presence cannot be felt and that wearing time is unlimited, an optimal state; Category B signifying that usually the lens cannot be felt, but occasional mild feeling or awareness of lens might occur; Category C signifying a tolerable condition, with wearing time frequently compromised to less time than the wearer desire; and Category D signifying discomfort which is usually constant and at a disconcerting level. The following results were obtained.

TABLE 2

Initial Study - Rating of Comfort when Wearing Contact Lenses

|  | Right (OD) Acuvue Lens with Conventional Liquid Packaging Vehicle | | | Left (OS) Acuvue Lens Removed from Conventional Vehicle and Immersed for 2 Hours in PG-101 Oil in Water Emulsion | | |
|---|---|---|---|---|---|---|
| Time | 1 | 2 | 3 | 1 | 2 | 3 |
| 1–2 minutes | C | B | C | C | B+ | C |
| 15 minutes | B | B– | C– | A | B+ | B |
| 30 minutes | B | B– | C– | A | A | B |
| 1 hour | B | C | D | A | A | B+ |
| 2 hours | B | C | D | A | A | B+ |
| 3 hours | B | C | D | A | A | B+ |

The above test was repeated using the same subjects several days later with the following results obtained.

TABLE 3

Repeat Study - Rating of Comfort when Wearing Contact Lenses

|  | Right (OD) Acuvue Lens with Conventional Liquid Packaging Vehicle | | | Left (OS) Acuvue Lens Removed from Conventional Vehicle and Immersed for 2 Hours in PG-101 Oil in Water Emulsion | | |
|---|---|---|---|---|---|---|
| Time | 1 | 2 | 3 | 1 | 2 | 3 |
| 1–2 minutes | C+ | B– | C– | C+ | B+ | C+ |
| 15 minutes | B– | B– | C | B+ | A | B+ |
| 30 minutes | B | B– | C– | A | A– | B+ |
| 1 hour | B | C+ | D+ | A | A | B+ |
| 2 hours | B– | C | D+ | A | A | B+ |
| 3 hours | B– | C | D+ | A | A | B+ |

EXAMPLE 2

This example demonstrates methods relating to the formation of an evaporation barrier layer over a lens surface prior to insertion of the lens into the eye. The following study prerequisites were established:

1. The lens should be studied in the same state as when removed from its foil package, without contamination even from the remote possibility of surgically scrubbed hands. This is in turn requires the development of a technique of removal of the lens from the foiled package with stainless tweezers, prepared by cleaning with alcohol and then flamed in a clean flame.

2. The lens is placed in a horizontal position parallel to the floor, with its outer surface pointed upwards, simulating an eye whose direction of gaze is at the ceiling and supported so as to maintain its usual curvature. This position is required to allow observation of the action of liquids placed on the lens surfaces.

3. The lens requires placement in a manner and on a surface with characteristics which would encourage the maintenance of hydration of the lens. If the lens becomes dehydrated, the experiment could be invalidated.

4. The techniques should allow observation of the application of the liquid to the lens surface under a microscope in real time to observe the immediate action of applied liquid on the lens surface such as beading or spreading.

Materials and Methods

A curved surface of approximately 8.50 mm in radius and 15.0 mm in diameter, manufactured from methylmethacrylate was mounted from the vertical supports of a Haag Streit slit-lamp microscope. The curved surface was mounted so that its radius of 8.5 mm was parallel to the floor so that the lens could be placed on the surface simulating an eye aimed upward at the ceiling. It was found desirable to cover the methylmethacrylate curved surface with a one-ply tissue paper which was fully hydrated with a normal saline solution to provide a surface free of possible surfactant contamination and to help maintain the hydration of the lens. The lens is then removed from the foil package with the stainless tweezers, and placed onto the curved surface covered with the hydrated one-ply tissue. When required, the lens is "smoothed down" on the curved surface by rolling the surface of the lens with a glass rod treated with normal saline. The surface of the lens is then observed with the Haag Streit microscope at 16 and 25× magnification with white light, both focal and diffuse, obtained from the Haag Streit illumination unit. Observations are then made of subsequent applications of micro amounts of liquid vehicles to the front surface of the lens, usually with 16× magnification. The liquid is applied to the front surface of the lens utilizing a glass rod of 155 microns in diameter and approximately 7.0 cms in length. The end features a rounded bulbous end of approximately 170 microns in diameter formed by flaming the end of the glass rod. This end is utilized for forming the drop.

Test 1: Drop of Saline Applied to Survue Lens Surface.

After the initial setup utilizing a new Survue lens (manufactured by Vistakon Division of Johnson & Johnson) obtained from its package and mounted as described, a small drop of approximately 2–3 microliters is formed at the bulbous end of the glass rod after dipping the rod into a container of saline. The glass rod with this drop at its bulbous end is then brought downward along the optical axis of the lens so as to approach the lens surface. At the precise moment of contact, as observed under the microscope, the drop "jumped" onto the lens surface. It then spread immediately without beading.

The above procedure was repeated with a new lens mounted on a fresh one-ply tissue. A new glass rod was utilized. The results were the same.

Conclusion

Saline spreads immediately on the surface of an Acuvue lens.

Test 2: Drop of Mineral Oil on Survue Lens Surface

The mineral oil utilized is labeled Draekol 35 and obtained from Penreco. The same method which was used in Experiment 1 was used to bring various sizes of drops of mineral oil into contact with the lens surfaces.

The first study of mineral oil utilized the smallest possible amount, approximately 1–2 microliters in size. After this minimum size drop is formed or the bulbous end of the glass rod, the rod approaches the lens surface downward along the optical axis, the drop "jumped" onto the lens surface as previously experienced with the saline drop. However, while the saline drop spread, the mineral oil drop did not spread. Rather, the drop remained as an almost perfect hemisphere on the lens surface. The application of this drop was directed toward the center of the lens to minimize the possible effects of downward inclination of the round surfaces. The diameter of the hemispherical mineral oil drop was measured with a reticule and found to be approximately 0.75 mm in diameter. Even when the device holding the lens was tilted so as to place the surface in a non-horizontal position, the drop remained beaded in the form of a hemisphere until tilted to almost the absolute vertical position. Even in this position the drop did not move immediately, but required approximately one minute to move significantly. The movement appeared to be the effect of gravity rather than the effect of spreading as evidenced by its movement downward rather than evenly in all directions.

The experiment was repeated with three different sizes of drops, resulting in hemispheres with base diameters varying from 1.0 mm to as much as 2.6 mm. The results were the same as with the smaller drop of mineral oil, rather than spreading a hemispherical shape formed. With the larger sizes of drops, particularly if a base diameter of 2.5 mm was exceeded, the weight of the drop appeared to cause some minimal expansion of the diameter of the drop, however spreading did not occur.

Conclusion

Mineral oil does not spread on the surface of a Survue lens.

Test 3: 5% Phosphatidylglycerol (PG) on Survue Lens Surface.

The procedures utilized in the prior experiments were repeated utilizing a formulation of 5% pure phosphatidylglycerol.

In contrast to the prior experiments, it was very difficult to make a drop at the bulbous end of the glass rod. The 5% PG formulation appeared to be very viscous and organized. Nevertheless, material was placed on the bulbous end of the glass rod and the method of approach to the surface as previously used repeated. As the surface was approached there was not a rapid "jumping" action, but rather a settling of the material onto the lens surface. There was no hemispherical form observed but rather a momentary heaping of the material. The material spread relatively completely as the seconds passed. Within 10 seconds, the PG formulation had spread relatively evenly over the lens surface.

The experiment was repeated with varying amounts of PG and the results remained the same.

Conclusion

PG spreads on the surface of the Survue lens, but not as fast as water. It is postulated that this phenomenon is the result of PG organizing the water and preventing rapid diffusional movement of the water. The effect of this interaction is to create a material of high viscosity. Spreading of PG along the surface is therefore at a decreased rate since the water molecules are not free to migrate as they are in water.

Test 4: Drop of Mineral Oil on Survue Lens Surface Previously Treated with PG.

The methods previously utilized were repeated. An amount of PG was obtained on the bulbous end of the glass rod and transferred to the lens surface. It was then "rolled" onto the lens surface with a glass rod treated with PG in order to obtain a more uniform spreading.

A drop of mineral oil was then obtained and "jumped" onto the lens surface treated with PG as previously described. The drop size was chosen to be approximately 1–2 microliters, so as to form a drop size of approximately 0.75 mm in base diameter. The drop upon reaching the surface spread, and after 10–20 seconds had decreased from an approximate height of 0.4 mm to an approximate height of 0.1 mm. A larger drop which resulted in a base diameter of approximately 2 mm, with a vertical height of approximately 1 mm, flattened or spread so that the vertical height was virtually flat (did not exceed 0.1 mm) after 10–20 seconds.

Conclusion

A drop of mineral oil placed on a Survue lens surface previously treated with PG spreads, a drop of mineral oil place on a Survue untreated lens surface does not spread.

Test 5: Drop of Mineral Oil on Survue Lens Surface, Half of Lens Surface Previously Treated with PG, Other Half Left Untreated A lens was prepared and mounted as in the prior tests. After its mounting, one-half of the lens was treated with PG which was rolled onto one-half of the surface of the lens with a glass rod. The lens was then examined under the microscope and a relatively clear line of demarcation could be seen between the treated and untreated portions of the lens. A small drop of mineral oil, approximately 1–2 microliters in diameter so as to make a hemisphere of approximately 0.75 mm in base diameter was first applied to the untreated half of the Survue lens. The drop did not spread, it remained in hemispherical form as previously described. Immediately thereafter a similar drop was applied to the half of the lens treated with the PG. It spread rather rapidly.

This experiment was repeated twice with the same results.

Conclusion

Mineral oil does not spread, as previously noted on an untreated Survue lens. Mineral oil does spread if the surface of the lens is treated with phosphatidylglycerol.

Test 6: Drop of Mineral Oil on Survue Lens Surface Previously Treated with Copious Amount of PG A lens was prepared and mounted as previously described. Copious PG in the form of an approximate 40 microliter drop was introduced onto the surface and then rubbed onto the surface utilizing the glass rod.

The drop sizes of mineral oil were chosen to form hemispheres on the lens surfaces with bases of approximately 0.75 mm for the smaller drop, and 2.0 mm for the larger drop.

The small drop placed at the apex spread so that its height was reduced by approximately 75% after 30 seconds to 2 minutes on repeated trials. The larger drop performed similar to the smaller drop and flattened approximately 75%.

Conclusion

The drop of mineral oil placed on a Survue lens surface previously treated with PG spreads significantly as evidenced by the decrease in the vertical height of the hemisphere demonstrating that only minimal amounts of PG are necessary for the spreading of the oil and further demonstrating that larger amounts provide no benefit and may in fact be undesirable.

Test 7: Drop of Mineral Oil on Survue Lens Surface Previously Treated with Copious Amount of Tween 80 Surfactant A lens was prepared and mounted as previously described. After its mounting a copious amount of Tween 80, a surfactant available from ICI of Wilmington, Del. comprising a stearyl ester of a polysorbate in the form of an appropriate 40 microliter drop was introduced to the surface, and then rubbed onto the surface utilizing a glass rod.

The drop sizes of mineral oil were chosen to form hemispheres on the lens surfaces with bases of approximately 0.75 mm for the smaller drop, and 2.0 mm for the larger drop.

The small drop placed at the apex spread so that its height was reduced by approximately 75% after 30 seconds to 2 minutes on repeated trials. The larger drop performed almost identically to the smaller drop, and flattened approximately the same amount.

Conclusion

The drop of mineral oil placed on a Survue lens surface treated with Tween 80 spreads significantly as evidenced by the decrease in the vertical height of the hemisphere. The spreading is essentially comparable to that occurring when the surface had been treated with PG.

Test 8: Drop of Mineral Oil on Survue Lens Surface Previously Treated with Copious Amount of MYRJ 52

A lens was prepared and mounted as previously described. After its mounting a copious amount of Myrj 52 surfactant in the form of an appropriate 40 microliter drop was introduced to the surface, and then rubbed onto the surface utilizing a glass rod.

The drop sizes of mineral oil were chosen to form hemispheres on the lens surfaces with bases of approximately 0.75 mm for the smaller drop, and 2.0 mm for the larger drop.

The smaller drop laced at the apex so that its height was reduced by approximately 50% after 5 to 30 seconds on repeated trials. The 2.0 mm drop performed almost identically to the smaller drop, and flattened approximately the same amount, 50%.

Conclusion

The drop of mineral oil placed on a Survue lens surface treated with MYRJ 52 spreads somewhat as evidenced by the decrease in the vertical height of the hemisphere. The magnitude of the spreading is not equivalent to that of a drop of water placed on a wet non-treated Survue lens surface. The spreading also does not appear to be as great as when the surfaces had been treated with PG and Tween 80. These results show that the interstitial layer between the lens and the layer of oil assists in the spreading of the oil, but that the ability to spread the oil is dependent upon the material used to form the interstitial layer.

I claim:

1. A sealed package comprising a hydrated hydrogel contact lens immersed in an aqueous storage liquid containing a film forming phosphoglyceride in an amount of at least 0.01 percent by weight, said film forming phosphoglyceride having hydrophilic terminus groups and hydrophobic terminus groups separated from said hydrophilic groups, said hydrated contact lens being in contact with said storage liquid in said package for a time sufficient for the hydrophilic terminus groups of the film forming material to hydrogen bond to at least the anterior hydrophilic surfaces of said hydrated contact lens.

2. The package of claim 1 where the phosphoglyceride is selected from the group consisting of phosphatidylglycerol and phosphatidylinositol.

3. The package of claim 2 where the phosphoglyceride is a phosphatidylglycerol.

4. A sealed package comprising a hydrated hydrogel contact lens immersed in an aqueous storage liquid, said storage liquid containing a film forming material in an amount of at least 0.01 percent by weight and a lipid in an amount of at least 0.05 percent by weight, said film forming material having hydrophilic terminus groups and hydrophobic terminus groups separated from said hydrophilic terminus groups by a spacer segment, said hydrated contact lens being in contact with said storage liquid in said package for a time of at least two hours, said time being sufficient for the hydrophilic terminus groups of the film forming material to hydrogen bond to at least the anterior hydrophilic surface of said hydrated contact lens and for the hydrophobic terminus groups to bond to the lipid.

5. The package of claim 4 where the percent of the film forming material varies between 0.05 and 5.0 percent.

6. The package of claim 4 where the aqueous storage solution is in the form of an emulsion.

7. The package of claim 4 where the lipid is an oil and the film forming material is a phospholipid.

8. The package of claim 7 where the lipid is mineral oil.

9. The package of claim 4 where the concentration of the lipid varies between 1 and 12.5 percent.

10. A method for forming an evaporation barrier over at least the anterior surface of a hydrated hydrogel contact lens, said method comprising immersion of said lens in an aqueous liquid containing a film forming phosphoglvceride in an amount of at least 0.01 percent by weight, said film forming phosphoglyceride having hydrophilic terminus groups and hydrophobic terminus groups separated from said hydrophilic terminus groups by a spacer segment, said immersion being for time of at least two hours, said time being sufficient to hydrogen bond hydrophilic groups of the film forming material to at least the anterior hydrated surfaces of the contact lens.

11. The method of claim 10 where the phosphoglyceride is selected from the group consisting of phosphatidylglycerol and phosphatidylinositol.

12. The method of claim 11 where the phosphoglyceride is a phosphatidylglycerol.

13. The method of claim 10 where the aqueous liquid is in the form of an emulsion.

14. A method for forming an evaporation barrier over at least the anterior surface of a hydrated hydrogel contact lens, said method comprising immersion of said lens in an aqueous liquid containing a film forming material in an amount of at least 0.01 percent by weight and a lipid in an amount of at least 0.05 percent by weight, said film forming material having hydrophilic terminus groups and hydrophobic terminus groups separated from said hydrophilic terminus groups by a spacer segment, said immersion being for a time of at least two hours, said time being sufficient to hydrogen bond hydrophilic groups of the film forming material to at least the anterior hydrated surfaces of the contact lens and to bond hydrophobic terminus groups of the film forming material.

15. The method of claim 14 where the film forming material is a phospholipid.

16. The method of claim 15 where the film forming material is a negatively charged phospholipid.

17. The method of claim 15 where the phospholipid is a phosphoglyceride.

18. The method of claim 17 where the phosphoglyceride is a phosphatidylglycerol.

19. The method of claim 14 where the lipid is an oil.

20. The method of claim 19 where the oil is mineral oil.

21. The method of claim 14 where the aqueous liquid is in the form of an emulsion.

22. The method of claim 21 where the concentration of the mineral oil varies between 1.0 and 12.5.

23. The method of claim 14 further containing a preservative.

24. A sealed package comprising a hydrated hydrogel contact lens immersed in an aqueous storage liquid containing a film forming material in an amount of at least 0.01 percent by weight and mineral oil in an amount of at least 0.05 percent by weight, said film forming material having hydrophilic terminus groups and hydrophobic terminus groups separated from said hydrophilic groups, said hydrated contact lens being in contact with said storage liquid in said package for a time of at least two hours, said time being sufficient to hydrogen bond the hydrophilic terminus groups of the film forming material to at least the anterior hydrophilic surfaces of said hydrated contact lens.

25. The sealed package of claim 24 where the film forming material is a phosphoglyceride.

26. The sealed package of claim 25 where the phosphoglyceride is a phosphatidyl glycerol.

27. The sealed package of claim 24 where the aqueous storage solution is in the form of an emulsion.

* * * * *